UNITED STATES PATENT OFFICE.

EDWARD WRAY, OF BIEBRICH-ON-THE-RHINE, GERMANY, ASSIGNOR TO THE FIRM OF KALLE AND COMPANY, AKTIENGESELLSCHAFT, OF BIEBRICH-ON-THE-RHINE, GERMANY.

MANUFACTURE OF VAT DYESTUFFS.

1,108,057.     Specification of Letters Patent.     Patented Aug. 18, 1914.

No Drawing.     Application filed October 29, 1913. Serial No. 798,106.

*To all whom it may concern:*

Be it known that I, EDWARD WRAY, chemist, and subject of the King of England, residing at 82 Rathausstrasse, Biebrich-on-the-Rhine, Germany, have invented certain new and useful Improvements in the Manufacture of Vat Dyestuffs, of which the following is a specification.

If isatin-alpha-derivatives are condensed with pheno-oxy-naphtho-carbazoles derived from alpha- or beta-naphthylamin, black vat dyestuffs are obtained. Now, I have found that also valuable indigoid coloring matters can be obtained by combining the 2-derivatives of the 2.3-diketodihydro-1-thionaphthene, their homologues or analogues with the above named pheno-oxy-naphtho-carbazoles; their substitution products, homologues or analogues.

The products of the present invention have a constitution represented graphically as follows:

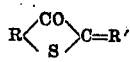

where R is the aromatic residue of the thionaphthene which may or may not be substituted and R' is the radical of the pheno-oxy-naphtho-carbazole.

Example: 23 parts of 2.1-pheno-5-oxy-naphtho-carbazole of the following formula:

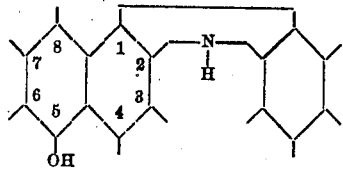

and 25 parts of sodium-acetate are dissolved in 300 parts of glacial acetic acid in the heat, whereupon 30 parts of 2-dibromo-3-ketodihydro-1-thionaphthene are gradually added in small portions. The dyestuff separates at once, it is filtered off in a hot condition and washed with some glacial acetic acid and alcohol. It has the following graphically represented constitution:

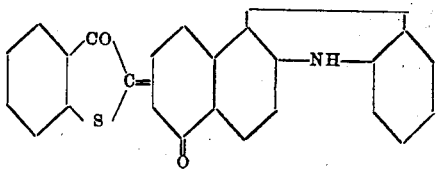

In a dry state it forms a bronze-like red-violet powder soluble in sulfuric acid with a green color. When reduced it forms a yellowish vat from which cotton is dyed very fast reddish-violet shades becoming redder on soaping.

The indigoid coloring matters thus produced may be treated with halogen and thus converted into halogenated derivatives. For instance, the above described condensation-product obtained from 2-dibromo-3-ketodihydro-1-thionaphthene and 2.1-pheno-oxy-naphtho-carbazole, when brominated in nitrobenzene, furnishes a halogenated derivative in the form of a blue-violet powder which is soluble in sulfuric acid with a bluish-green color. It yields on treatment with a solution of hydrosulfite and alkali a yellow vat from which cotton is dyed blue-violet shades becoming redder on soaping.

I claim:

1. Process for producing vat dyestuffs which consists in condensing the 2-derivatives of the 2.3-diketodihydro-1-thionaphthene with pheno-oxy-naphtho-carbazole.

2. Process for producing vat dyestuffs which consists in condensing 2-dibromo-3-ketodihydro-1-thionaphthene with 2.1-pheno-5-oxy naphtho-carbozole.

3. As new products the indigoid coloring matters obtainable by condensing the 2-derivatives of the 2.3-diketodihydro-1-thionaphthenes with pheno-oxy-naphtho-carbazoles, having the following graphically represented constitution:

where R is the aromatic nucleus of the thionaphthene and R' the radical of the pheno-oxy-napththo-carbazole, forming in dry state red-violet powders, insoluble in water, scarcely soluble in alcohol, soluble in hot nitrobenzene and quinolin, also soluble in sulfuric acid with a green color, being reduced on treatment with alkali and hydrosulfite to a yellow vat from which cotton is dyed very fast red-violet shades.

4. As a new product the indigoid coloring matter from 2-dibromo-3-ketodihydro-1-thionaphthene and 2.1-pheno-5-oxy-naphtho-carbazole of the following constitution:

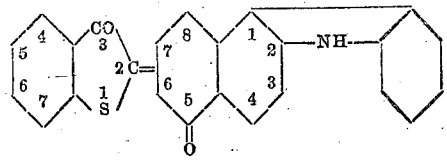

being in dry state a bronze-like red-violet powder, soluble in sulfuric acid with a green color and yielding on treatment with alkaline reducing agents a yellow vat from which cotton is dyed very fast reddish-violet shades becoming slightly redder on soaping.

In testimony whereof I have signed my name to this specification in the presence of two subscribing witnesses.

EDWARD WRAY.

Witnesses:
MORITZ WETZEL,
MARIA MENKS.